US012798406B2

(12) United States Patent
Tanaka et al.

(10) Patent No.: US 12,798,406 B2
(45) Date of Patent: Nov. 17, 2026

(54) VEHICLE CHARGING SYSTEM AND ELECTRIC VEHICLE

(71) Applicant: SUBARU CORPORATION, Tokyo (JP)

(72) Inventors: Yasufumi Tanaka, Tokyo (JP); Hayata Mimatsu, Tokyo (JP); Yasushi Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 720 days.

(21) Appl. No.: 18/224,164

(22) Filed: Jul. 20, 2023

(65) Prior Publication Data

US 2024/0034160 A1 Feb. 1, 2024

(30) Foreign Application Priority Data

Jul. 29, 2022 (JP) ................................ 2022-121428

(51) Int. Cl.

| | |
|---|---|
| ***H02J 7/00*** | (2026.01) |
| ***B60L 50/60*** | (2019.01) |
| ***B60L 53/12*** | (2019.01) |
| ***H02J 7/14*** | (2006.01) |
| ***H02J 50/10*** | (2016.01) |
| *H02J 105/37* | (2026.01) |

(52) U.S. Cl.

CPC ............... *B60L 53/12* (2019.02); *B60L 50/60* (2019.02); *H02J 50/10* (2016.02); *H02J 2105/37* (2026.01)

(58) Field of Classification Search

CPC ........ B60L 53/12; H02J 50/10; H02J 2105/37

USPC ........................................................ 320/132

See application file for complete search history.

(56) References Cited

U.S. PATENT DOCUMENTS

| | | | | |
|---|---|---|---|---|
| 11,077,765 B2 * | 8/2021 | Takemoto | B60L 1/00 | |
| 11,383,607 B1 * | 7/2022 | Prasad | B60L 53/24 | |
| 2011/0187184 A1 | 8/2011 | Ichikawa | | |
| 2012/0249065 A1 * | 10/2012 | Bissonette | H02J 3/322 | 320/109 |
| 2013/0271148 A1 * | 10/2013 | Maeda | B60L 3/0046 | 324/426 |

(Continued)

FOREIGN PATENT DOCUMENTS

JP 2009-225587 A 10/2009

*Primary Examiner* — Alexis B Pacheco

(74) *Attorney, Agent, or Firm* — Troutman Pepper Locke LLP

(57) ABSTRACT

A vehicle charging system to be applied to an electric vehicle includes a rectifier, an inverter, first and second relays, and a control processor. The rectifier is disposed on a charging path. The inverter is disposed on a first power feeding path. The first and second relays are respectively disposed on the charging path and a second power feeding path. The control processor performs control that allows for: contactless charging via the charging path from external equipment; and first power feeding to an external device via the charging path and the first power feeding path from the external equipment, or second power feeding to the external device via the second power feeding path from the external equipment. The control processor controls operation states of the relays in accordance with power being supplied from the external equipment, power requested at a battery, and power necessary at the external device.

9 Claims, 6 Drawing Sheets

(56) References Cited

U.S. PATENT DOCUMENTS

| | | | | |
|---|---|---|---|---|
| 2014/0225437 | A1* | 8/2014 | Mizuno | B60L 53/14 307/66 |
| 2015/0054466 | A1* | 2/2015 | Kinomura | B60L 53/14 320/134 |
| 2016/0185241 | A1* | 6/2016 | Kinomura | B60L 58/40 180/65.245 |
| 2016/0200213 | A1* | 7/2016 | Wolf | G01R 31/396 903/907 |
| 2019/0351781 | A1* | 11/2019 | Ben David | B60L 53/31 |
| 2020/0070672 | A1* | 3/2020 | Vahedi | B60L 53/11 |
| 2020/0122585 | A1* | 4/2020 | Bhat | G05B 19/0426 |
| 2021/0188106 | A1* | 6/2021 | Asa | B60L 53/122 |
| 2022/0009373 | A1* | 1/2022 | Patel | B60L 55/00 |
| 2022/0185137 | A1* | 6/2022 | Cesiel | B60L 53/62 |
| 2022/0379760 | A1* | 12/2022 | Pathipati | B60L 53/12 |
| 2022/0402390 | A1* | 12/2022 | Smolenaers | B60L 53/22 |
| 2023/0025134 | A1* | 1/2023 | Kim | H02J 7/933 |

* cited by examiner

COMPARATIVE EXAMPLE

| MAGNITUDE RELATIONSHIP BETWEEN EQUIPMENT ELECTRIC POWER Pin, BATTERY'S REQUESTED ELECTRIC POWER Pb, AND EXTERNAL DEVICE ELECTRIC POWER Pout | OPERATION STATES OF RELAYS 161 AND 162 | OPERATION STATE OF INVERTER 15 |
|---|---|---|
| Pin > (Pout + Pb) | RELAY 161: ON-STATE<br>RELAY 162: ON-STATE | OFF-STATE<br>(STOPPED) |
| (Pout + Pb) > Pin > Pout | RELAY 161: ON-STATE<br>RELAY 162: OFF-STATE | ON-STATE<br>(IN OPERATION) |
| Pin < Pout | RELAY 161: OFF-STATE<br>RELAY 162: ON-STATE | OFF-STATE<br>(STOPPED) |

FIG. 3

WHEN $P_{in} > (P_{out} + P_b)$

VEHICLE CHARGING SYSTEM AND ELECTRIC VEHICLE

CROSS-REFERENCE TO RELATED APPLICATION

The present application claims priority from Japanese Patent Application No. 2022-121428 filed on Jul. 29, 2022, the entire contents of which are hereby incorporated by reference.

BACKGROUND

The disclosure relates to a vehicle charging system, and to an electric vehicle including the vehicle charging system.

Various techniques have been disclosed regarding a vehicle charging system, i.e., a charging system to be applied to an electric vehicle. Reference is made to Japanese Unexamined Patent Application Publication No. 2009-225587, for example.

SUMMARY

An aspect of the disclosure provides a vehicle charging system to be applied to an electric vehicle. The vehicle charging system includes a rectifier, an inverter, a first relay, a second relay, and a control processor. The rectifier is disposed on a charging path from a coil in the electric vehicle to a battery of the electric vehicle. The inverter is disposed on a first electric power feeding path from the battery to an electric power output terminal of the electric vehicle, the electric power output terminal allowing for feeding of electric power stored in the battery to an external device. The first relay is disposed on the charging path. The second relay is disposed on a second electric power feeding path from the coil to the electric power output terminal. The control processor is configured to perform control that allows for: contactless charging of the battery via the charging path from external equipment; and first electric power feeding that causes electric power to be fed to the external device via the charging path and the first electric power feeding path from the external equipment, or second electric power feeding that causes electric power to be fed to the external device via the second electric power feeding path from the external equipment. The control processor is configured to control an operation state of each of the first relay and the second relay in accordance with equipment electric power, battery's requested electric power, and external device electric power, where the equipment electric power is electric power being supplied to the coil from the external equipment, the battery's requested electric power is electric power requested at the battery, and the external device electric power is electric power necessary at the external device.

An aspect of the disclosure provides an electric vehicle including a vehicle charging system to be applied to an electric vehicle. The vehicle charging system includes a rectifier, an inverter, a first relay, a second relay, and a control processor. The rectifier is disposed on a charging path from a coil in the electric vehicle to a battery of the electric vehicle. The inverter is disposed on a first electric power feeding path from the battery to an electric power output terminal of the electric vehicle, the electric power output terminal allowing for feeding of electric power stored in the battery to an external device. The first relay is disposed on the charging path. The second relay is disposed on a second electric power feeding path from the coil to the electric power output terminal. The control processor is configured to perform control that allows for: contactless charging of the battery via the charging path from external equipment; and first electric power feeding that causes electric power to be fed to the external device via the charging path and the first electric power feeding path from the external equipment, or second electric power feeding that causes electric power to be fed to the external device via the second electric power feeding path from the external equipment. The control processor is configured to control an operation state of each of the first relay and the second relay in accordance with equipment electric power, battery's requested electric power, and external device electric power, where the equipment electric power is electric power being supplied to the coil from the external equipment, the battery's requested electric power is electric power requested at the battery, and the external device electric power is electric power necessary at the external device.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 3 illustrates operation state examples according to one example embodiment.

DETAILED DESCRIPTION

Figure 1:
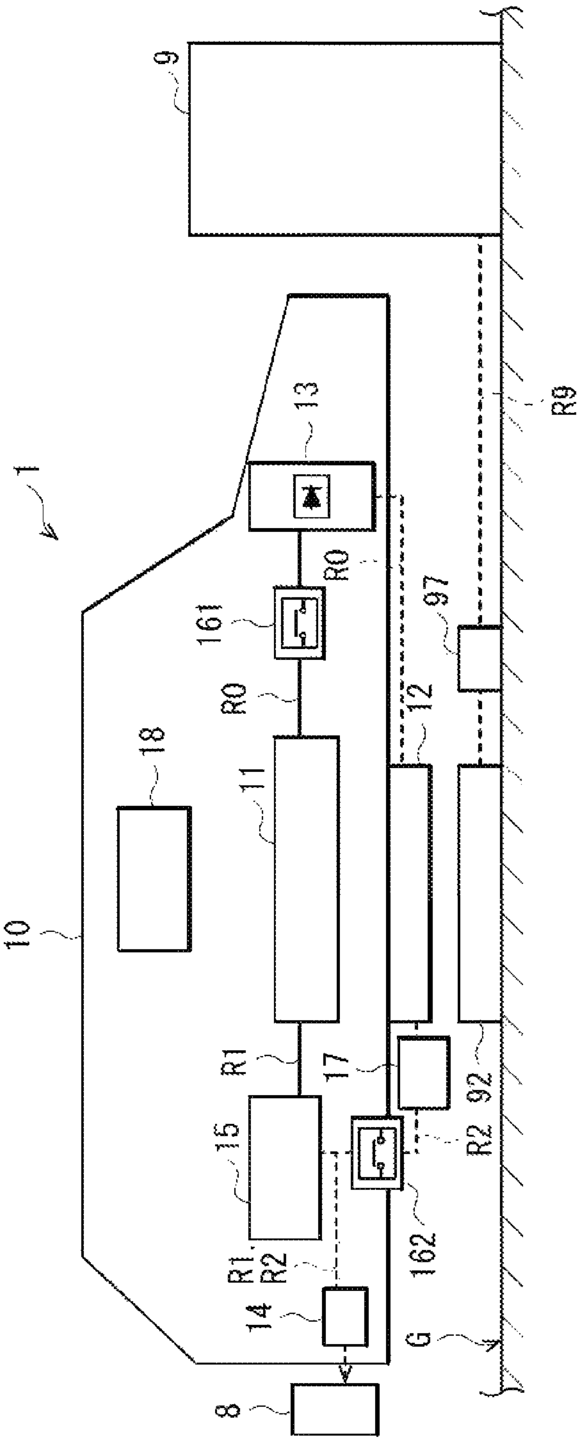
FIG. 1 is a block diagram illustrating a schematic configuration example of an electric vehicle according to one example embodiment of the disclosure, together with external elements.

For example, improved convenience is demanded of a charging system to be applied to an electric vehicle.

It is desirable to provide a vehicle charging system that makes it possible to improve convenience, and an electric vehicle including such a vehicle charging system.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. It is to be noted that the description is given in the following order.

FIG. 1 is a block diagram illustrating a schematic configuration example of an electric vehicle 1 according to an example embodiment of the disclosure, together with external elements. The electric vehicle 1 may be an EV (Electric vehicle) or a hybrid electric vehicle (HEV).

The electric vehicle 1 may include a vehicle body 10, a battery 11, a vehicle-side coil 12, a rectifier 13, an electric power output terminal 14, an inverter 15, relays 161 and 162, a frequency converter 17, and a control processor 18. Further, as illustrated in FIG. 1, external equipment 9, an equipment-side coil 92, and a frequency converter 97 may be provided in the vicinity of the electric vehicle 1. The external equipment 9 may be installed on a ground G. The equipment-side coil 92 may be electrically coupled to the external equipment 9 via an external cable R9. The frequency converter 97 may be disposed on the external cable R9. Although details will be described later, the electric vehicle 1 performs contactless charging from the external equipment 9 via the vehicle-side coil 12 and the equipment-side coil 92.

In one embodiment, the rectifier 13, the inverter 15, the relays 161 and 162, and the control processor 18 may serve together as a "vehicle charging system". In one embodiment, the relay 161 may server as a "first relay", and the relay 162 may serve as a "second relay". In one embodiment, the vehicle-side coil 12 may serve as a "coil in the electric vehicle".

The battery 11 may store electric power to be used by the electric vehicle 1. The battery 11 may include, for example, any of various secondary batteries including, without limitation, a lithium ion battery. Although details will be described later, the electric power stored in the battery 11 is feedable to an external device 8.

The external equipment 9 may be coupled to, for example, an electric power grid and allow the electric vehicle 1 to perform charging and discharging contactlessly, or wirelessly. For example, although details will be described later, contactless charging is performed on the electric vehicle 1 from the external equipment 9.

The external device 8 may be any of various home appliances, for example. Although details will be described later, electric power is fed from the electric vehicle 1 to the external device 8. So-called vehicle-to-load (V2L) is thereby achieved.

As illustrated in FIG. 1, the vehicle-side coil 12 may be disposed below the vehicle body 10 of the electric vehicle 1, for example. In one example, the vehicle-side coil 12 may be disposed to face the equipment-side coil 92 coupled to the external equipment 9. This allows contactless electric power feeding to be performed between the vehicle-side coil 12 and the equipment-side coil 92. Details will be described later.

The rectifier 13 is disposed on a charging path R0 illustrated in FIG. 1 through which the battery 11 is to be contactlessly charged from the external equipment 9 via the external cable R9 with the frequency converter 97 thereon, the equipment-side coil 92, and the vehicle-side coil 12. In one example, in FIG. 1, the rectifier 13 may be disposed between the vehicle-side coil 12 and the relay 161 to be described later, on the charging path R0 from the vehicle-side coil 12 to the battery 11. The rectifier 13 may convert alternating-current (AC) electric power supplied contactlessly from the external equipment 9 into direct-current (DC) electric power, and output the DC electric power toward the battery 11. That is, the rectifier 13 may perform unidirectional AC-to-DC conversion, or rectification.

For convenience, in FIG. 1 and also in FIG. 2 and FIGS. 4 to 6 to be described later, an AC electric power path is indicated in a broken line, and a DC electric power path is indicated in a solid line, among paths each coupling any two or more of the external equipment 9, the equipment-side coil 92, components inside the electric vehicle 1, and the external device 8 to each other.

The electric power output terminal 14 allows for output or feeding of the electric power stored in the battery 11 to the outside. In some embodiments, the electric power output terminal 14 may be a connector. In one example, although details will be described later, the electric power stored in the battery 11 may be outputted to the external device 8 via the inverter through the electric power output terminal 14 to thereby allow for electric power feeding to the external device 8. This electric power feeding corresponds to first electric power feeding Rs1 to be described later.

As illustrated in FIG. 1, the inverter 15 is disposed on a first electric power feeding path R1 from the battery 11 to the electric power output terminal 14. The inverter 15 may convert DC electric power supplied from the battery 11 into AC electric power, and output the AC electric power. That is, the inverter 15 may perform a DC-to-AC conversion.

The relay 161 may be disposed between the rectifier 13 and the battery 11 on the above-described charging path R0. The relay 161 may be switchable between an on-state, i.e., a state of connecting the charging path R0, and an off-state, i.e., a state of interrupting the charging path R0, in accordance with control by the control processor 18 to be described later.

As illustrated in FIG. 1, the relay 162 is disposed on a second electric power feeding path R2 from the vehicle-side coil 12 to the electric power output terminal 14. The relay 162 may also be switchable between an on-state, i.e., a state of connecting the second electric power feeding path R2, and an off-state, i.e., a state of interrupting the second electric power feeding path R2, in accordance with control by the control processor 18.

As illustrated in FIG. 1, the frequency converter 17 may be disposed between the relay 162 and the vehicle-side coil 12 on the second electric power feeding path R2 described above. The frequency converter 17 may convert a frequency of electric power supplied from the vehicle-side coil 12, which may be about several kilohertz, into a frequency for home appliances, i.e., 50 Hz or 60 Hz, and output the converted frequency toward the relay 162.

In contrast, the frequency converter 97 described previously may convert a frequency of electric power supplied from the external equipment 9, i.e., the above-described frequency for home appliances, into a frequency of about several kilohertz, and output the converted frequency to the equipment-side coil 92.

The control processor 18 may control various operations of the electric vehicle 1, including a travel operation, an operation of charging the battery 11, an operation of feeding electric power to the external device 8, and operations of various components, and perform various kinds of arithmetic processing. In one example, the control processor 18 performs control that allows for contactless charging Rc of the battery 11 via the charging path R0 from the external equipment 9. Further, the control processor 18 performs control that allows for the first electric power feeding Rs1 or second electric power feeding Rs2. The first electric power feeding Rs1 causes electric power to be fed to the external device 8 via the charging path R0 and the first electric power feeding path R1 from the external equipment 9. The second electric power feeding Rs2 causes electric power to be fed to the external device 8 via the second electric power feeding path R2 from the external equipment 9.

Although details will be described later, the control processor 18 may control respective operation states of, for example, the relays 161 and 162 and the inverter 15 in accordance with equipment electric power Pin, battery's requested electric power Pb, and external device electric power Pout. The equipment electric power Pin refers to electric power being supplied to the vehicle-side coil 12 from the external equipment 9. The battery's requested electric power Pb refers to electric power requested at the battery 11. The external device electric power Pout refers to electric power necessary at the external device 8. Controlling the respective operation states of, for example, the relays 161 and 162 and the inverter 15 in such a manner allows for performing of each of the above-described contactless charging Rc and the above-described first electric power feeding Rs1 or second electric power feeding Rs2.

Control processes to be performed by the control processor 18 on, for example, the relays 161 and 162 and the inverter 15 will be described in detail later with reference to FIGS. 3 to 6.

The control processor 18 may include one or more processors or central processing units (CPUs) each executing a program, and one or more memories communicably coupled to the one or more processors. The memories may each include, for example, a random-access memory (RAM) that temporarily holds processing data, and a read-only memory (ROM) that contains the program.

Operations, workings, and some example effects of the present example embodiment will now be described in detail in comparison with a comparative example.

Figure 2:
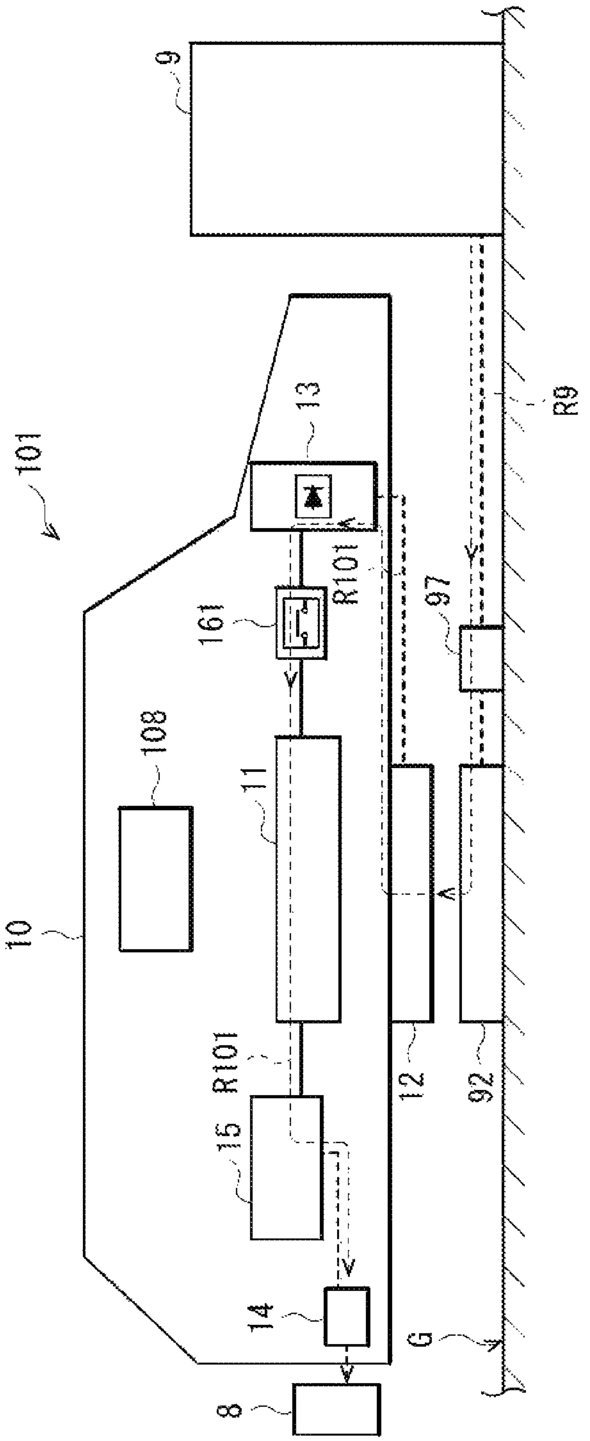
FIG. 2 is a block diagram illustrating a schematic configuration example of an electric vehicle according to a comparative example, together with the external elements.

FIG. 2 is a block diagram illustrating a schematic configuration example of an electric vehicle 101 according to a comparative example, together with the external elements. The electric vehicle 101 according to the comparative example corresponds to the electric vehicle 1 according to the present example embodiment illustrated in FIG. 1. The electric vehicle 101 has a configuration similar to that of the electric vehicle 1 except that a control processor 108 is provided in place of the control processor 18, and that the relay 162 and the frequency converter 17 are omitted.

In the electric vehicle 101 of the comparative example, contactless charging is performed on the battery 11 in the electric vehicle 101 from the external equipment 9, and electric power feeding from the battery 11 to the external device 8 is also performed, in accordance with various kinds of control by the control processor 108.

For example, the electric power feeding to the external device 8 is performed together with the contactless charging of the battery 11, via the frequency converter 97, the equipment-side coil 92, the vehicle-side coil 12, the rectifier 13, the relay 161, the battery 11, the inverter 15, and the electric power output terminal 14, from the external equipment 9. See a path R101 in FIG. 2.

However, when the electric power feeding to the external device 8 is performed via such a path R101, efficiency of the electric power feeding to the external device 8 can be degraded because the path R101 passes through each of the relay 161, the battery 11, and the inverter 15. In the comparative example, this can result in loss of convenience.

In contrast, in the electric vehicle 1 according to the present example embodiment, the respective operation states of the relays 161 and 162 and the inverter 15 are controlled in accordance with the equipment electric power Pin, the battery's requested electric power Pb, and the external device electric power Pout described above. For example, the respective operation states of the relays 161 and 162 and the inverter 15 may be controlled in accordance with a magnitude relationship between Pin, Pb, and Pout. In the present example embodiment, the above-described contactless charging Rc and the above-described first electric power feeding Rs1 or second electric power feeding Rs2 are thereby each executed in a manner detailed in detail below.

With reference to FIGS. 3 to 6 in addition to FIG. 1, a detailed description will be given below of a process example including example control processes to be performed by the control processor 18 in performing respective operations of the contactless charging Rc, the first electric power feeding Rs1, and the second electric power feeding Rs2 described above according to the present example embodiment.

Figure 4:
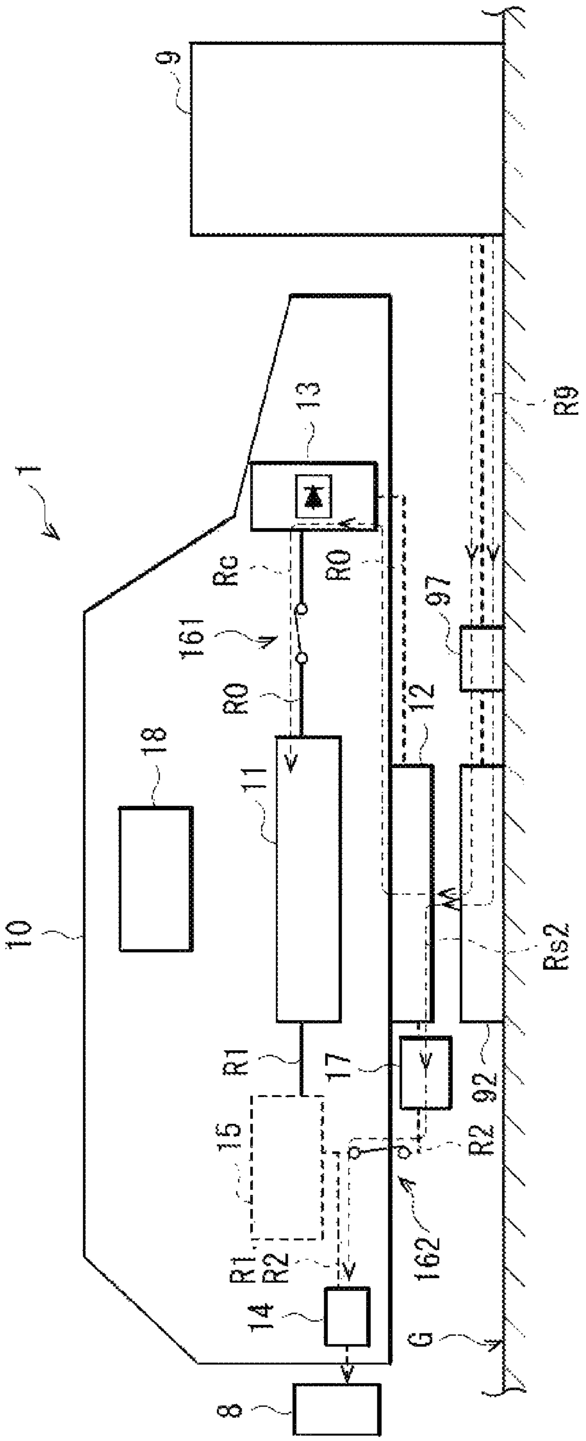
FIG. 4 is a block diagram illustrating a first one of the operation state examples illustrated in FIG. 3.
Figure 5:
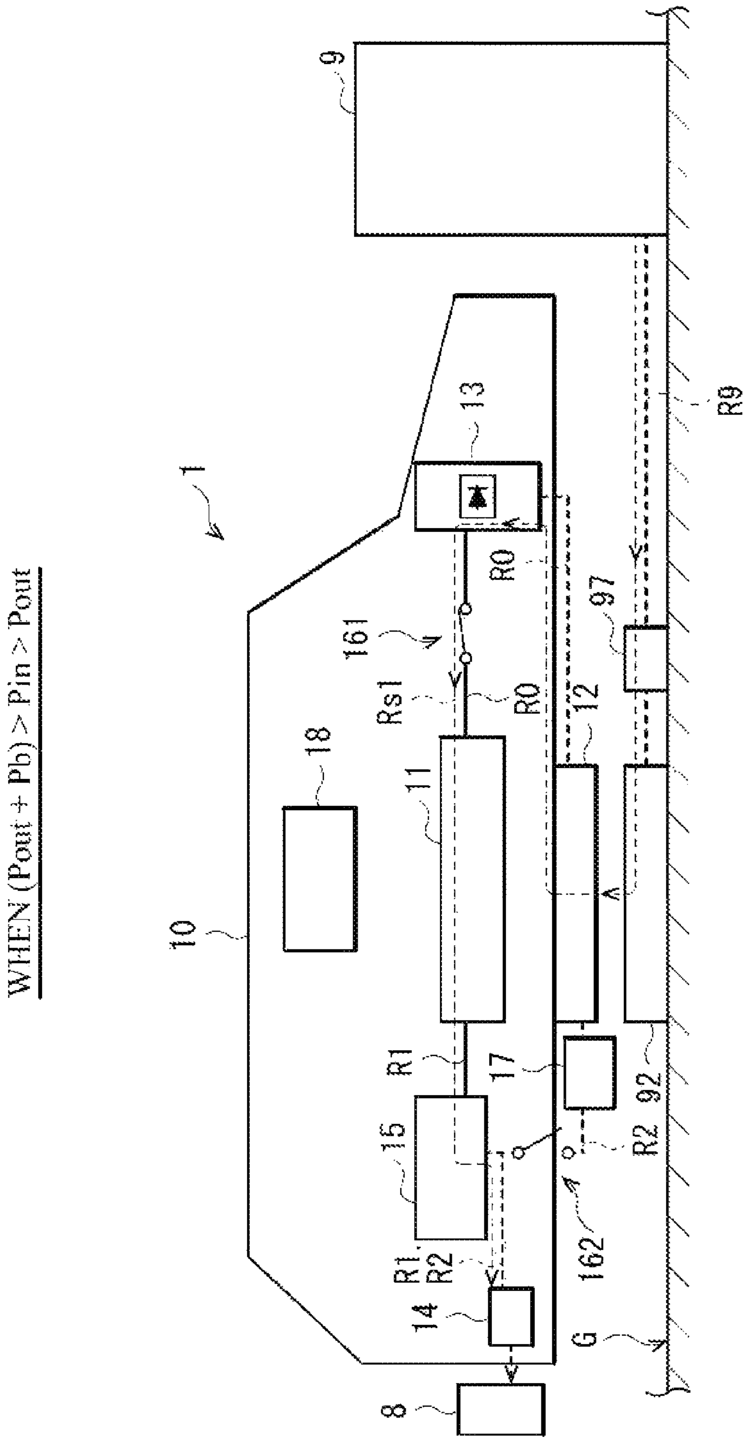
FIG. 5 is a block diagram illustrating a second one of the operation state examples illustrated in FIG. 3.
Figure 6:
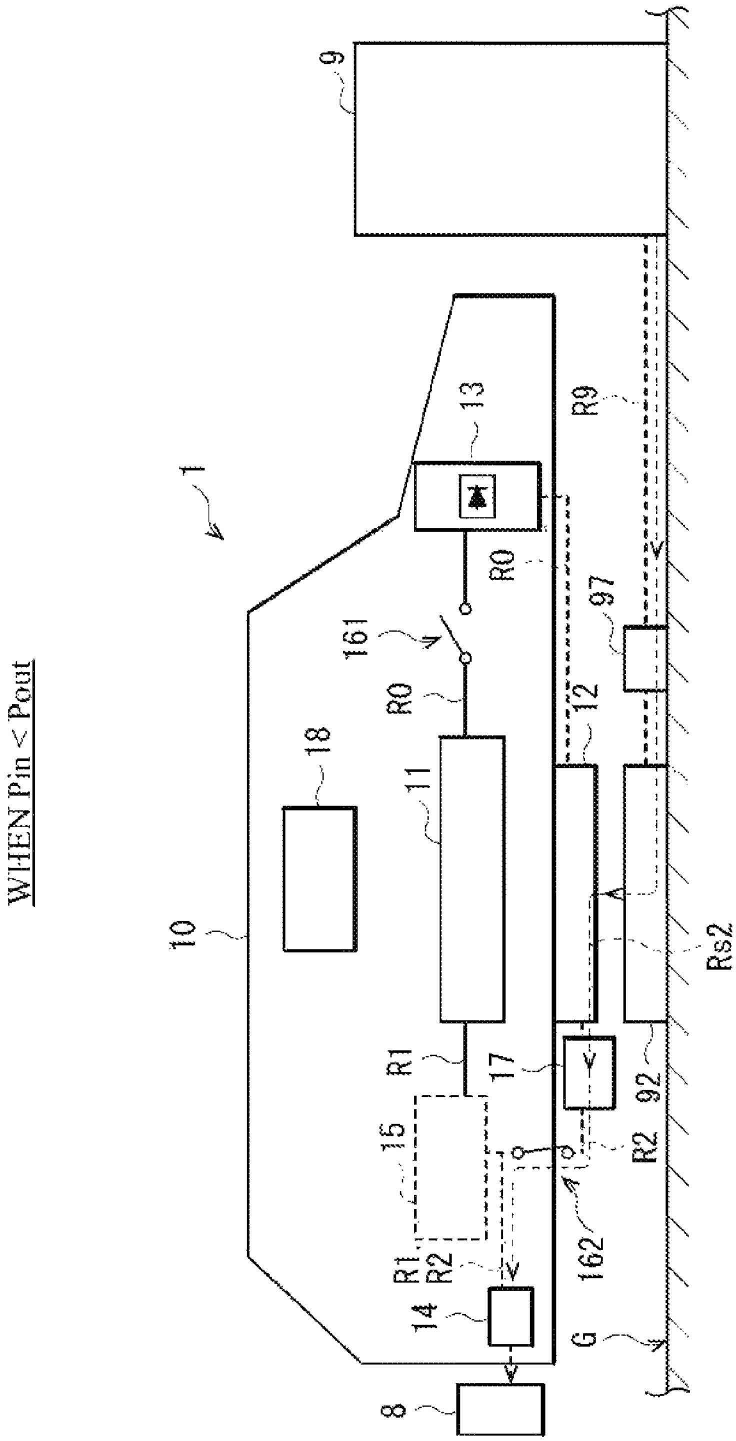
FIG. 6 is a block diagram illustrating a third one of the operation state examples illustrated in FIG. 3.

FIG. 3 presents a table summarizing operation state examples according to the present example embodiment, that is, example operation states when one or more of the above-described operations are performed. FIGS. 4 to 6 are block diagrams illustrating respective operation state examples in three kinds of situations described in FIG. 3. Note that, for convenience, the inverter 15 illustrated as a broken-line block in any of FIGS. 4 to 6 indicates that operation of the inverter 15 is stopped, that is, the inverter 15 is in an off-state described below.

First, as illustrated in FIGS. 3 and 4, when the following relational expression is satisfied: equipment electric power Pin>(external device electric power Pout+battery's requested electric power Pb), that is, when the equipment electric power Pin is greater than a sum of the external device electric power Pout and the battery's requested electric power Pb, the control processor 18 may perform the following control process on the operation states. In the above-described situation, the control processor 18 may set each of the relays 161 and 162 to the on-state or connecting state, and set the inverter 15 to the off-state or stopped state.

This allows for the contactless charging Rc via the charging path R0 from the external equipment 9 and the second electric power feeding Rs2 via the second electric power feeding path R2 from the external equipment 9, as illustrated in FIG. 4, for example. In this case, electric power feeding, i.e., the second electric power feeding Rs2, to the external device 8 is performed without passing through, for example, the charging path R0 including the relay 161, the battery 11, and the inverter 15, in contrast to the above-described comparative example.

As illustrated in FIGS. 3 and 5, when the following relational expression is satisfied: (external device electric power Pout+battery's requested electric power Pb)>equipment electric power Pin>external device electric power Pout, that is, when the sum of the external device electric power Pout and the battery's requested electric power Pb is greater than the equipment electric power Pin and the equipment electric power Pin is greater than the external device electric power Pout, the control processor 18 may perform the following control process on the operation states. In the above-described situation, the control processor 18 may set the relay 161 to the on-state, set the relay 162 to the off-state or interrupting state, and set the inverter 15 to an on-state, that is, put the inverter 15 into operation.

This allows the first electric power feeding Rs1 via the charging path R0 and the first electric power feeding path R1 from the external equipment 9 to be preferentially performed while the contactless charging of the battery 11 is being performed, as illustrated in FIG. 5, for example. In this case, electric power feeding, i.e., the first electric power feeding Rs1, to the external device 8 is performed via the battery 11 while the battery 11 is being charged. This allows for feeding of necessary electric power to the external device 80, that is, performing preferential electric power feeding to the external device 8.

As illustrated in FIGS. 3 and 6, when the following relational expression is satisfied: equipment electric power Pin<external device electric power Pout, that is, when the equipment electric power Pin is less than the external device electric power Pout, the control processor 18 may perform the following control process on the operation states. In the above-described situation, the control processor 18 may set the relay 161 to the off-state, set the relay 162 to the on-state, and set the inverter 15 to the off-state or stopped state.

This allows the second electric power feeding Rs2 via the second electric power feeding path R2 from the external equipment 9 to be performed without the contactless charging via the charging path R0 from the external equipment 9 being performed, as illustrated in FIG. 6, for example. In this case also, in contrast to the above-described comparative example, electric power feeding, i.e., the second electric power feeding Rs2, to the external device 8 is performed without passing through, for example, the charging path R0 including the relay 161, the battery 11, and the inverter 15.

According to the electric vehicle 1 of the example embodiment described above, the respective operation states of the relays 161 and 162 and the inverter 15 are controlled in accordance with the equipment electric power Pin, the battery's requested electric power Pb, and the external device electric power Pout. This allows the above-described contactless charging Rc and the above-described first electric power feeding Rs1 or second electric power feeding Rs2 to be each executed.

In some embodiments, as described above, the first electric power feeding Rs1 may be preferentially executed while the contactless charging Rc is being performed, or the second electric power feeding Rs2 may be performed without passing through the charging path R0, for example. Improved efficiency of electric power feeding to the external device 8 is thereby achieved. This helps to improve convenience in the present example embodiment, as compared with the comparative example described above.

Although some example embodiments of the disclosure have been described hereinabove, the disclosure is not limited to the foregoing example embodiments, and various modifications may be made thereto.

For example, the configurations, including type, shape, arrangement, and the number of pieces, of respective components of the electric vehicle 1 and the vehicle charging and discharging system are not limited to those described in the example embodiments. The configuration of each of the components may be modified by employing any other type, shape, arrangement, number of pieces, etc. In addition, values, ranges, magnitude relationships, etc., of various parameters described in the example embodiments are non-limiting, and any other values, ranges, magnitude relationships, etc. may be employed.

For example, although the process example including the example control processes to be performed by the control processor 18 in performing the charging operation and the electric power feeding operation has been described in the example embodiment above, such an example is non-limiting. In some embodiments, any of other techniques may be employed to perform the processes in performing the charging operation and the electric power feeding operation.

The series of processes described in the example embodiment above may be performed by hardware such as circuitry, or by software such as a program. When the series of processes is to be performed by software, the software may include a group of programs for causing a computer to execute various operations. Each program may be a built-in program that is incorporated in the computer in advance for use. Each program may alternatively be installed in the computer from a network or a computer-readable medium for use, for example.

In addition, the various examples described hereinabove may be applied in any combination. Further, the disclosure encompasses any possible combination of some or all of the various embodiments described herein and incorporated herein.

The vehicle charging system and the electric vehicle according to at least one embodiment of the disclosure each make it possible to improve convenience.

The effects described herein are mere examples and non-limiting, and other effects may be achieved.

The control processor 18 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control processor 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control processor 18 illustrated in FIG. 1.

The invention claimed is:

1. A vehicle charging system to be applied to an electric vehicle, the vehicle charging system comprising:

a rectifier disposed on a charging path from a coil in the electric vehicle to a battery of the electric vehicle;

an inverter disposed on a first electric power feeding path from the battery to an electric power output terminal of the electric vehicle, the electric power output terminal allowing for feeding of electric power stored in the battery to an external device;

a first relay disposed on the charging path;

a second relay disposed on a second electric power feeding path from the coil to the electric power output terminal; and a control processor configured to perform control that allows for:

contactless charging of the battery via the charging path from external equipment; and causing electric power to be fed to the external device (i) via the charging path and the first electric power feeding path from the external equipment as a first electric power feeding, or (ii) via the second electric power feeding path from the external equipment as a second electric power feeding, wherein the control processor is configured to control an operation state of each of the first relay and the second relay in accordance with equipment electric power, battery's requested electric power, and external device electric power, where the equipment electric power is electric power being supplied to the coil from the external equipment, the battery's requested electric power is electric power requested at the battery, and the external device electric power is electric power necessary at the external device, wherein the control processor is configured to perform at least one of:

when the equipment electric power is greater than a sum of the external device electric power and the battery's requested electric power, performing the control that allows for the contactless charging of the battery via the charging path from the external equipment and the second electric power feeding that causes the electric power to be fed to the external device, by setting each of the first relay and the second relay to an on-state and stopping operation of the inverter; or when the equipment electric power is less than the external device electric power, performing the control that allows the second electric power feeding that causes the electric power to be fed to the external device, by setting the first relay to an off-state, setting the second relay to an on-state, and stopping operation of the inverter.

2. The vehicle charging system according to claim 1, wherein the control processor is configured to, when a sum of the external device electric power and the battery's requested electric power is greater than the equipment electric power and the equipment electric power is greater than the external device electric power, perform the control that allows the first electric power feeding that causes the electric power to be fed to the external device via the charging path and the first electric power feeding path from the external equipment, wherein the first electric power feeding is preferentially performed while the contactless charging of the battery via the charging path from the external equipment is being performed, by setting the first relay to an on-state, setting the second relay to an off-state, and putting the inverter into operation.

3. An electric vehicle comprising a vehicle charging system to be applied to an electric vehicle, the vehicle charging system comprising:

a rectifier disposed on a charging path from a coil in the electric vehicle to a battery of the electric vehicle;

an inverter disposed on a first electric power feeding path from the battery to an electric power output terminal of the electric vehicle, the electric power output terminal allowing for feeding of electric power stored in the battery to an external device;

a first relay disposed on the charging path;

a second relay disposed on a second electric power feeding path from the coil to the electric power output terminal; and a control processor configured to perform control that allows for:

contactless charging of the battery via the charging path from external equipment; and causing electric power to be fed to the external device (i) via the charging path and the first electric power feeding path from the external equipment as a first electric power feeding, or (ii) via the second electric power feeding path from the external equipment as a second electric power feeding, wherein the control processor is configured to control an operation state of each of the first relay and the second relay in accordance with equipment electric power, battery's requested electric power, and external device electric power, where the equipment electric power is electric power being supplied to the coil from the external equipment, the battery's requested electric power is electric power requested at the battery, and the external device electric power is electric power necessary at the external device, wherein the control processor is configured to perform at least one of:

when the equipment electric power is greater than a sum of the external device electric power and the battery's requested electric power, performing the control that allows for the contactless charging of the battery via the charging path from the external equipment and the second electric power feeding that causes the electric power to be fed to the external device, by setting each of the first relay and the second relay to an on-state and stopping operation of the inverter; or when the equipment electric power is less than the external device electric power, performing the control that allows the second electric power feeding that causes the electric power to be fed to the external device, by setting the first relay to an off-state, setting the second relay to an on-state, and stopping operation of the inverter.

4. The vehicle charging system according to claim 1, wherein the first relay is disposed between the rectifier and the battery on the charging path.

5. The vehicle charging system according to claim 1, wherein the external device comprises a home appliance, and wherein the vehicle charging system further comprises a frequency converter disposed on the second electric power feeding path, the frequency converter being configured to convert a frequency of electric power supplied from the coil into a frequency for home appliances and output the electric power having the converted frequency toward the second relay.

6. The vehicle charging system according to claim 1, wherein the coil is a vehicle-side coil disposed below a vehicle body of the electric vehicle and configured to face an equipment-side coil coupled to the external equipment to allow contactless electric power feeding between the vehicle-side coil and the equipment-side coil.

7. The electric vehicle according to claim 3, wherein the first relay is disposed between the rectifier and the battery on the charging path.

8. The electric vehicle according to claim 3, wherein the external device comprises a home appliance, and wherein the vehicle charging system further comprises a frequency converter disposed on the second electric power feeding path, the frequency converter being configured to convert a frequency of electric power supplied from the coil into a frequency for home appliances and output the electric power having the converted frequency toward the second relay.

9. The electric vehicle according to claim 3, wherein the coil is a vehicle-side coil disposed below a vehicle body of the electric vehicle and configured to face an equipment-side coil coupled to the external equipment to allow contactless electric power feeding between the vehicle-side coil and the equipment-side coil.

* * * * *